United States Patent [19]

Luth

[11] Patent Number: 4,684,314

[45] Date of Patent: Aug. 4, 1987

[54] PIPE HANDLING APPARATUS

[75] Inventor: Royse I. Luth, Riverton, Wyo.

[73] Assignee: Weatherford/Lamb, Inc., Houston, Tex.

[21] Appl. No.: 654,199

[22] Filed: Sep. 24, 1984

[51] Int. Cl.[4] .............................................. E21B 19/00
[52] U.S. Cl. ..................................... 414/745; 175/52;
175/85; 198/316.1; 198/861.1; 104/45; 104/49;
414/590; 414/501; 414/917; 414/528; 182/63;
254/5 C; 187/9 R; 187/18
[58] Field of Search ............... 414/589, 590, 22, 745,
414/917, 747, 471, 501, 546, 749, 750, 744 R,
495, 527, 528, 523; 198/314, 315, 316, 317, 318,
863; 175/85, 52; 182/63; 104/45, 49, 48, 50;
187/9 R, 18; 254/5 R, 5 B, 5 C, 88

[56] References Cited

U.S. PATENT DOCUMENTS

| | | | |
|---|---|---|---|
| 711,008 | 10/1902 | Scott | 254/5 C |
| 1,139,891 | 5/1915 | Miller | 254/5 C |
| 1,423,878 | 7/1922 | Potter et al. | 198/863 |
| 1,826,116 | 10/1931 | Andrews | 254/5 C |
| 2,617,547 | 11/1952 | Pridy . | |
| 2,676,715 | 4/1954 | Pridy . | |
| 2,900,091 | 8/1959 | Minter | 414/745 X |
| 2,922,533 | 1/1960 | La Barge, Jr. | 414/745 |
| 2,931,519 | 4/1960 | Beach | 414/589 |
| 3,103,291 | 1/1963 | Cresci et al. . | |
| 3,168,206 | 2/1965 | Washington | 414/495 X |
| 3,259,255 | 7/1966 | Cresci | 414/590 |
| 3,268,095 | 8/1966 | Durbin . | |
| 3,315,822 | 4/1967 | Wilson | 414/22 |
| 3,446,379 | 5/1969 | Phillips . | |
| 3,499,498 | 3/1970 | Bromell et al. | 175/85 |
| 3,559,821 | 6/1969 | James . | |
| 3,599,784 | 8/1971 | Rossi | 198/316 |
| 3,706,347 | 3/1971 | Brown | 175/85 |
| 3,780,883 | 7/1972 | Brown . | |
| 3,785,506 | 1/1974 | Crocuer et al. . | |
| 3,792,783 | 5/1972 | Brown . | |
| 3,810,553 | 5/1974 | Crocuer et al. . | |
| 3,916,500 | 11/1975 | Brown | 414/22 X |
| 4,054,210 | 10/1977 | Crocuer . | |
| 4,162,873 | 7/1979 | Smith, Jr. . | |
| 4,235,566 | 11/1980 | Beeman et al. | 414/22 |
| 4,236,861 | 9/1978 | Grove | 414/548 |
| 4,347,028 | 9/1979 | Dugan | 414/22 |
| 4,371,302 | 9/1980 | Frias et al. | 414/22 |
| 4,382,738 | 5/1983 | Frias | 414/22 |
| 4,386,883 | 7/1983 | Hogan et al. | 414/22 |
| 4,403,898 | 9/1983 | Thompson | 414/22 |
| 4,426,182 | 9/1981 | Frias et al. | 414/22 |
| 4,453,872 | 12/1981 | Frias et al. | 414/22 |
| 4,470,740 | 11/1982 | Frias | 414/22 |
| 4,474,520 | 3/1982 | Buckner et al. | 414/22 |
| 4,491,449 | 1/1985 | Hawkins | 414/10 |
| 4,491,450 | 1/1985 | George | 414/22 |
| 4,552,498 | 11/1985 | Dysarz | 414/22 |

FOREIGN PATENT DOCUMENTS

1267166  4/1968  Fed. Rep. of Germany ...... 198/318

*Primary Examiner*—Frank E. Werner
*Attorney, Agent, or Firm*—Vaden, Eickenroht, Thompson & Boulware

[57] ABSTRACT

A pipe handling apparatus is adapted for transferring oil well pipe to and from a drilling rig. The apparatus includes a transportable chassis having tracks for supporting and guiding a reciprocable and rotatable table. A first scissors lift mounted to the table provides vertical motion to a platform to which is mounted a second scissors lift. The second scissors lift is designed to impart vertical and horizontal motion to a conveyor. The conveyor comprises three axially spaced endless belts for moving the pipe longitudinally to the conveyor takeoff point. Tapered spades protrude into the spaces during the pipe return operation to eject the pipe from the conveyor. The conveyor and platform are reciprocable with respect to the second and first scissors lifts, respectively. The chassis includes pivotable arms for raising a pipe to the top of the collapsed scissors lifts so that a pipe rolls onto the conveyor belts prior to lifting.

11 Claims, 6 Drawing Figures

PIPE HANDLING APPARATUS

BACKGROUND OF THE INVENTION

1. Field of the Invention

This invention pertains to pipe handling equipment, and more particularly to apparatus for transferring pipes to and from an oil drilling rig.

2. Description of the Prior Art

Various equipment has been developed to transfer materials and articles between locations having different vertical and horizontal positions. For example, U.S. Pat. No. 3,103,291 shows a vehicle useful for loading and unloading airplanes, and U.S. Pat. No. 3,446,379 shows a scissors-type high lift elevating mechanism. U.S. Pat. No. 4,162,873 discloses an extensible boom lift which includes a table mounted on a scissors-type lifting device and supporting a beam which is rotatable about a vertical axis. An extensible boom is supported by the rotatable beam.

The handling of long and heavy pipes as used in oil drilling operations presents difficult problems. Such pipes are heavy, cumbersome, and dangerous to move from a stack thereof to a drilling rig and back to the stack. Specifically, accurately positioning a pipe where it can be readily grabbed by a pipe elevator for adding to a string of pipes is a formidable task.

An example of oil pipe handling equipment is shown in U.S. Pat. No. 2,617,547, which discloses a pipe loading device having lifting arms attached to a chassis and adapted to raise lengths of pipe from the ground to a pair of transversely inclined pipe rests. The pipe rests are supported by a scissors-type lifting platform for vertically raising the pipes to a higher level. The device of U.S. Pat. No. 2,617,547 is disadvantageous because the pipe on the platform cannot be transferred under power along a longitudinal axis, and also because the pipe remains horizontal during lifting operations, thereby making it difficult to grab by a pipe elevator. U.S. Pat. No. 2,676,715 shows a self-loading truck having loading arms for raising pipe from the ground to a selected height above the bed of the truck. The truck does not include means for unloading the pipe from a drilling rig.

U.S. Pat. No. 3,785,506 shows a drill pipe handling apparatus for controlling the descent of a pipe from a derrick floor to a lower pipe support, and from the pipe support to a pipe rack therebelow. The device of U.S. Pat. No. 3,785,506 is not capable of raising pipe from the ground to a derrick floor. U.S. Pat. No. 3,810,553 illustrates a pipe handling device which is capable of lifting a pipe from the ground onto a pair of connected dollies. The dollies are reciprocable to move the pipe longitudinally onto and up an inclined chute to the rig platform. The device is also capable of the reverse operation of transporting a pipe from the rig to the ground. U.S. Pat. No. 4,054,210 shows a pipe carrier which is movably mounted on an elevated first cable suspended between the ground and derrick. A disadvantage of the devices of U.S. Pat. Nos. 3,785,506; 3,810,553; and 4,054,210 is that they cannot be readily moved to other stacks of pipes or derricks.

U.S. Pat. No. 4,236,861 shows a pipe handler with a scissors lift for supporting a platform and pipe support racks. A pivotable lifting mechanism transports the pipes from the ground to the platform rails. A selected pipe is positioned over a pipe lifting device which raises it vertically above the rails to a desired height. The handler does not include any mechanism for assisting the horizontal transfer of a pipe to another structure.

Thus, a need exists for a transportable pipe handling device which is capable of efficiently manipulating heavy pipe through large vertical and horizontal distances between a stack thereof and a rig platform.

SUMMARY OF THE INVENTION

In accordance with the present invention, versatile apparatus is provided for transferring heavy and cumbersome pipe from a supply of pipes at ground level to a selected location distant therefrom and for returning the pipe to the supply stack. This is accomplished by apparatus which includes a conveyor for longitudinally translating the pipe and which is vertically movable by a lift device. The conveyor lift device in turn is mounted through a conventional scissors-type lift device to a carriage supported for reciprocable and rotatable motion within a transportable chassis. The chassis may be constructed in the general fashion of an over-the-road flat bed trailer, and it is intended that the chassis be transported by a conventional motor vehicle tractor.

The conveyor and platform are fully collapsible so as to nest into the chassis, and the conveyor is designed with a longitudinally extending trough adapted to receive the pipe. To raise a pipe from a stack thereof, two or more arms are pivotally mounted to the chassis for lifting the pipe to the top level of the nested platform. The pipe rolls across the top level of the platform onto a conveyor belt, which forms the bottom surface of the trough. The conveyor lift device is designed so that as it is extended under hydraulic power to raise the conveyor vertically, it also imparts a horizontal movement to the conveyor.

The conveyor lift device is mounted to a platform which is vertically raisable in conventional fashion by a scissors-type lift. The platform scissors lift is supported by a carriage which reciprocates along the chassis, thus providing additional horizontal movement to the pipe for reaching the required position on the rig platform. The carriage is designed with a base which slides along and is supported by tracks in the chassis and with a table which is swivably supported by the base for rotation about a vertical axis. To minimize the collapsed height of the invention, the chassis tracks for the carriage base are on two levels. The lower level extends for the majority of the length of the chassis. When the carriage is in the lower level, the table cannot swivel. Ramped tracks join the upper and lower track levels, so that the carriage may be rolled between the upper and lower levels. When in the upper level tracks, the carriage table may swivel on each side of the chassis longitudinal axis. Thus, the versatility of the present invention is greatly increased because it is capable of handling pipes which are stacked in any orientation relative to the drilling rig.

It is a feature of the present invention that the platform, which supports the conveyor and conveyor lift device, is also horizontally slidable relative to the chassis, carriage, and platform lift. For that purpose, the platform includes a longitudinally extensible brace which is insertable inside the platform. The outer end of the extensible brace is provided with vertically adjustable legs capable of contacting the ground regardless of the height of the platform. The brace and legs support one end of the platform when the platform is moved horizontally out of contact with one of the platform lift support members, so that the platform is supported only by a second platform lift support member and the extended brace. To provide even greater horizontal motion for facilitating the positioning of a pipe at the derrick, the conveyor is also designed to translate relative to the conveyor lift device. The carriage table may be swiveled prior to the platform and/or conveyor being moved horizontally relative to the carriage. Consequently, maximum versatility for accurately manipulating the pipe to a wide variety of rig platform locations is achieved, thereby increasing the drilling efficiency.

To further increase pipe handling efficiency and convenience, the conveyor belt is built in at least two sections with longitudinal spaces between the sections. When returning a pipe from the derrick to the stack, a tapered spade protrudes through the spaces so as to eject the pipe from the conveyor and deflect it to a selected side of the chassis for returning to the pipe stack.

Other objects and advantages of the invention will become apparent to those skilled in the art from the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
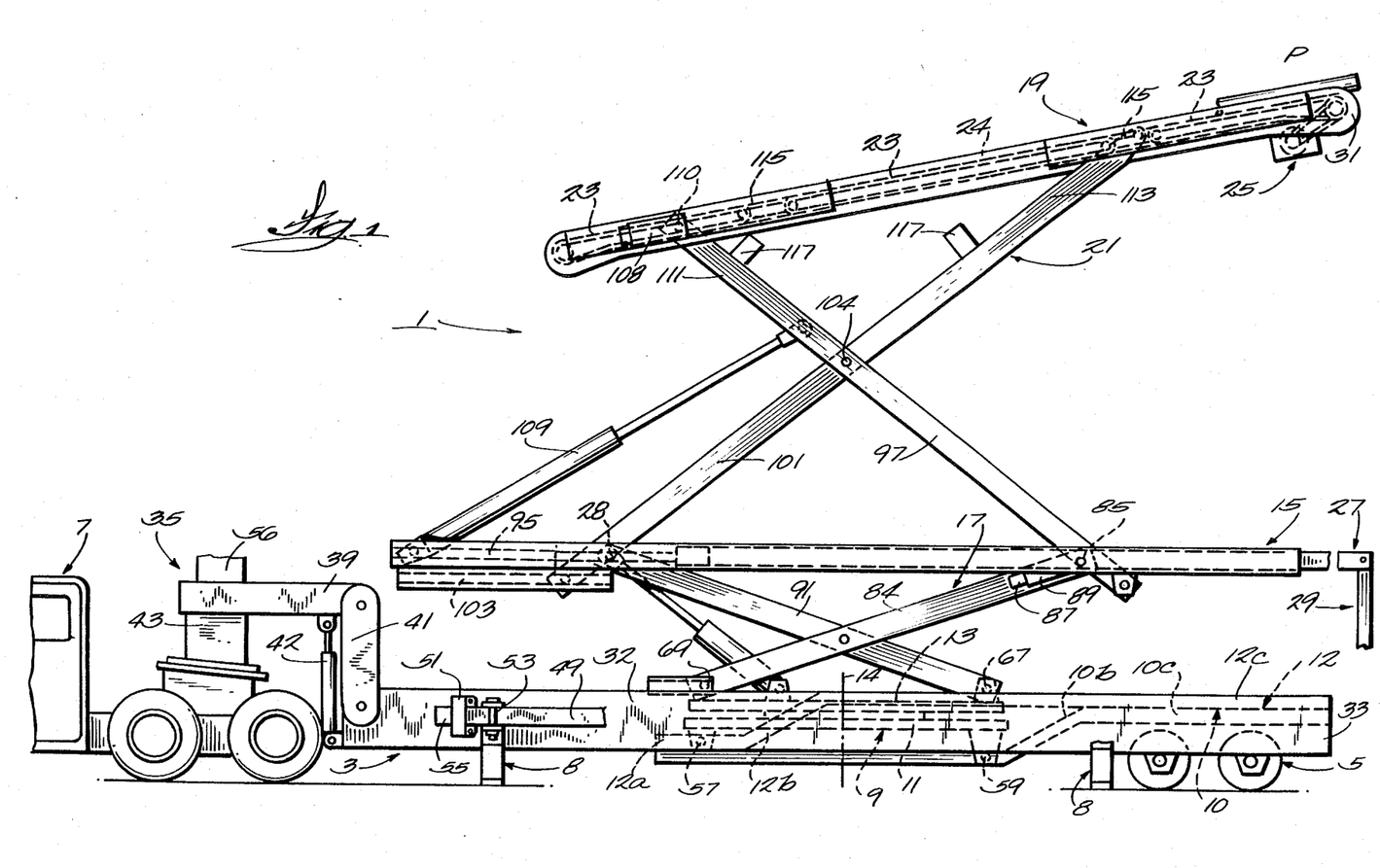
FIG. 1 is a side view of the pipe handling apparatus of the present invention shown in an opened condition.

Referring primarily to FIG. 1, a pipe handling apparatus 1 is illustrated which includes the present invention. The pipe handling apparatus finds particular usefulness in transferring long and heavy pipes between a supply thereof stacked on the ground and the drilling platform of an oil derrick. However, it will be understood that the invention is not limited to oil field operations.

General

The pipe handling apparatus 1 comprises a chassis 3 which is adapted for over-the-road travel by the use of conventional wheel and axle assemblies 5. The chassis 3 is attachable to and transportable by a tractor 7 in a well known manner. At least two pipe raising arms 8 are rotatably mounted to each side of the chassis.

Carried in the chassis 3 for linear and rotational motion relative thereto is a carriage 9. The carriage 9 includes a base 11 which reciprocates longitudinally along the chassis within tracks 10 and 12, and a table 13 which swivels on the base about a vertical axis 14. Swiveling is possible only when the carriage has ascended the ramped portions 10b and 12b of tracks 10 and 12 respectively. The carriage table 13 supports a platform 15 by means of a scissors-type lifting device 17. The scissors lift 17 is designed to raise and lower the platform 15 by imparting thereto only vertical motion. When fully collapsed, the platform nests within the chassis, FIGS. 3 and 4.

Figure 3:
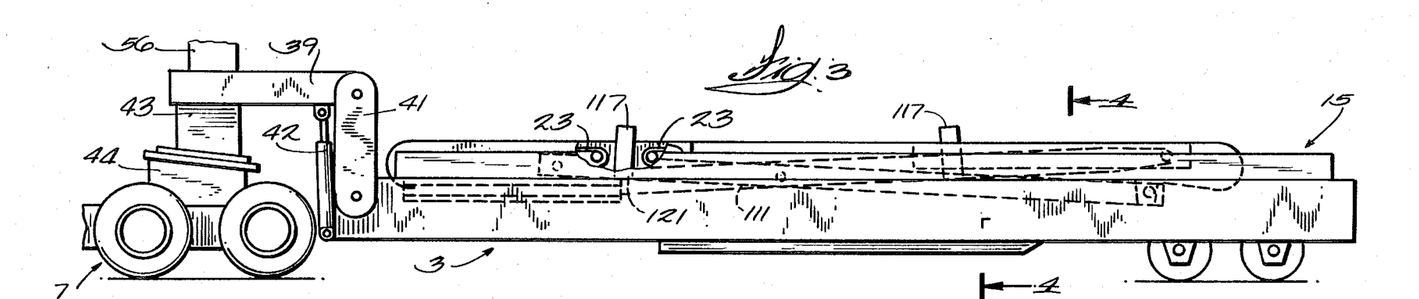
FIG. 3 is a partially broken side view of the pipe handling apparatus in an almost fully collapsed condition.
Figure 4:
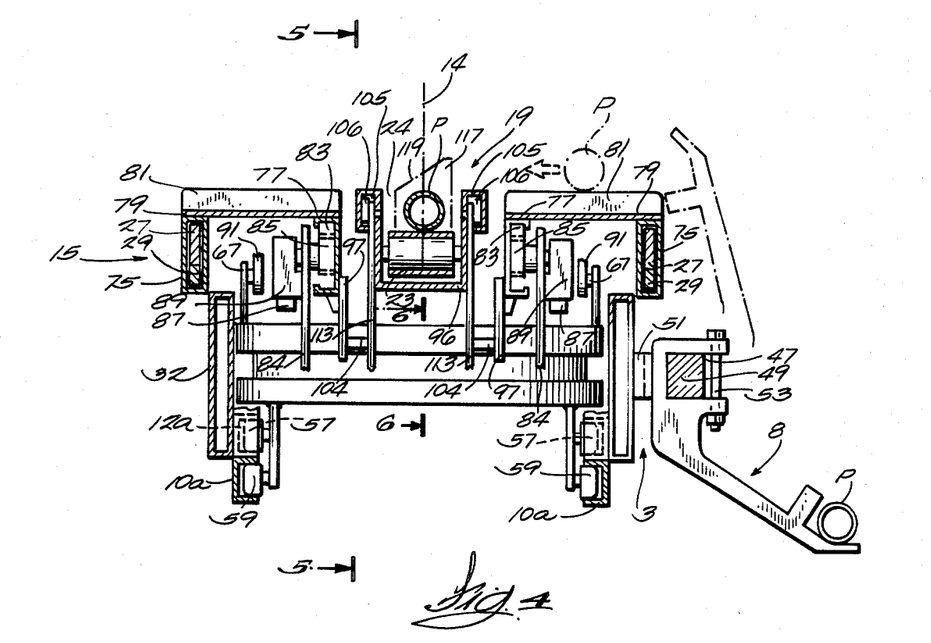
FIG. 4 is an enlarged sectional view taken along lines 4—4 of FIG. 3.

Supported by the platform 15 is a conveyor 19. The conveyor 19 is movable relative to the platform in both vertical and horizontal directions through the action of a modified scissors lift 21. Referring to FIGS. 1 and 4, the conveyor 19 includes a plurality of in-line belts 23 located at the bottom of a trough 24. The belts 23 are driven in unison by a suitable power source 25. When the lift 21 is fully collapsed, the conveyor nests within the platform, FIGS. 3 and 4.

Figure 5:
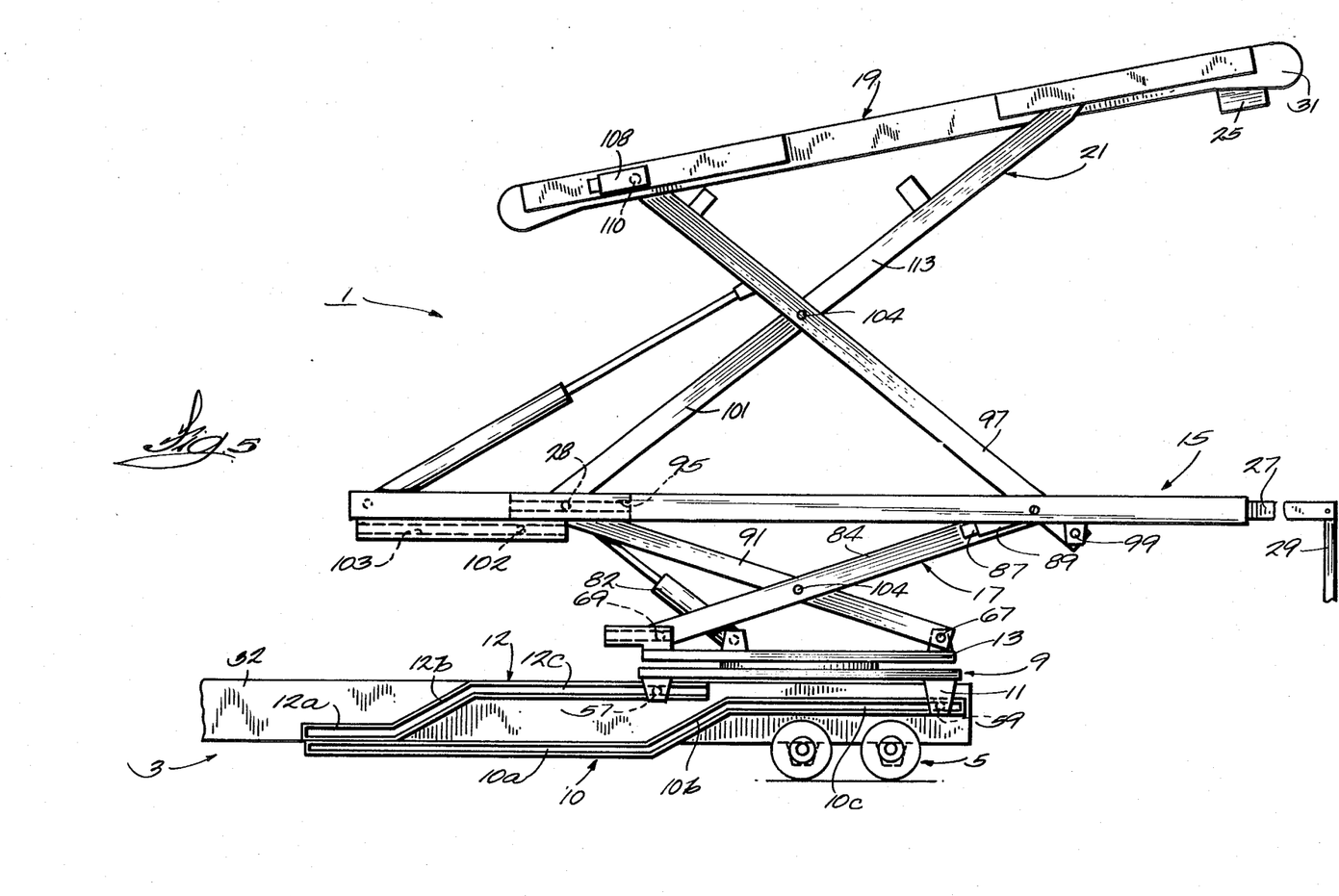
FIG. 5 is a partial longitudinal sectional view taken generally along lines 5—5 of FIG. 4, but showing the pipe handling apparatus in an opened configuration and in a position for swiveling about a vertical axis.

To increase the horizontal range of the pipe handling apparatus of the present invention, the platform 15 is horizontally slidable to the right, as viewed in FIGS. 1 and 5, with respect to the scissors lift 17. A horizontally extensible brace 27 with support legs 29 is slidably mounted within the platform, so that the platform is supported at its distal end as the platform slides off the support rollers 28 of the scissors lift 17. The support legs 29 are pivotable so as to fold against the brace 27 when the brace is retracted into the platform. To provide additional horizontal range to the present invention, the conveyor 19 is also translatable relative to the scissors lift 21.

In operation, the chassis 3 is parked next to a stack of pipes, not shown, so that the longitudinal axes of the pipes and chassis are parallel. The conveyor 19 and platform 15 are completely collapsed. A pipe is rolled onto the pipe lift arms 8, and the arms are swung upwardly to lift the pipe from the ground. Continued rotation of the arms cause the pipe to roll onto the top of the platform and into the conveyor trough 24. Either or both scissors lifts 17 and 21 are operated to raise the conveyor so that the conveyor takeoff point 31 is near the desired height. Additional horizontal and/or vertical positioning is accomplished by moving the carriage 9 along the chassis, by moving the platform on the scissors lift 17, and by moving the conveyor on the scissors lift 21. If necessary to reach the derrick platform, the carriage 9 is moved up the ramps 10b and 12b to enable the carriage table 13 to swivel. When the takeoff point 31 is at the proper location, the power source 25 is energized to cause the belts 23 to axially move the pipe P, thereby enabling the rig pipe elevators, not illustrated, to grab and lift the pipe from the conveyor. To return the pipe from the derrick to the stack on the ground, the foregoing procedure is essentially reversed.

Chassis

The chassis 3 of the present invention is preferably constructed as a semi-trailer, having a pair of longitudinal beams 32 rigidly joined by cross members and having conventional rear wheel assemblies 5 mounted near the back end 33. The chassis is built with the beams 32 as low to the ground as possible. Consequently, the front end 35 is fabricated with angled members 39 and 41 for enabling the chassis to be transported by a conventional trailor 7. Under normal conditions, the members 39 and 41 are locked by suitable pins and hydraulic cylinders 42 in the angled configuration shown in FIG. 1. To the lower side of member 39 is mounted a support and bearing 43 for pivotally mounting the front end of the chassis to the fifth wheel 44 to the tractor 7, as is well known.

Figure 2:
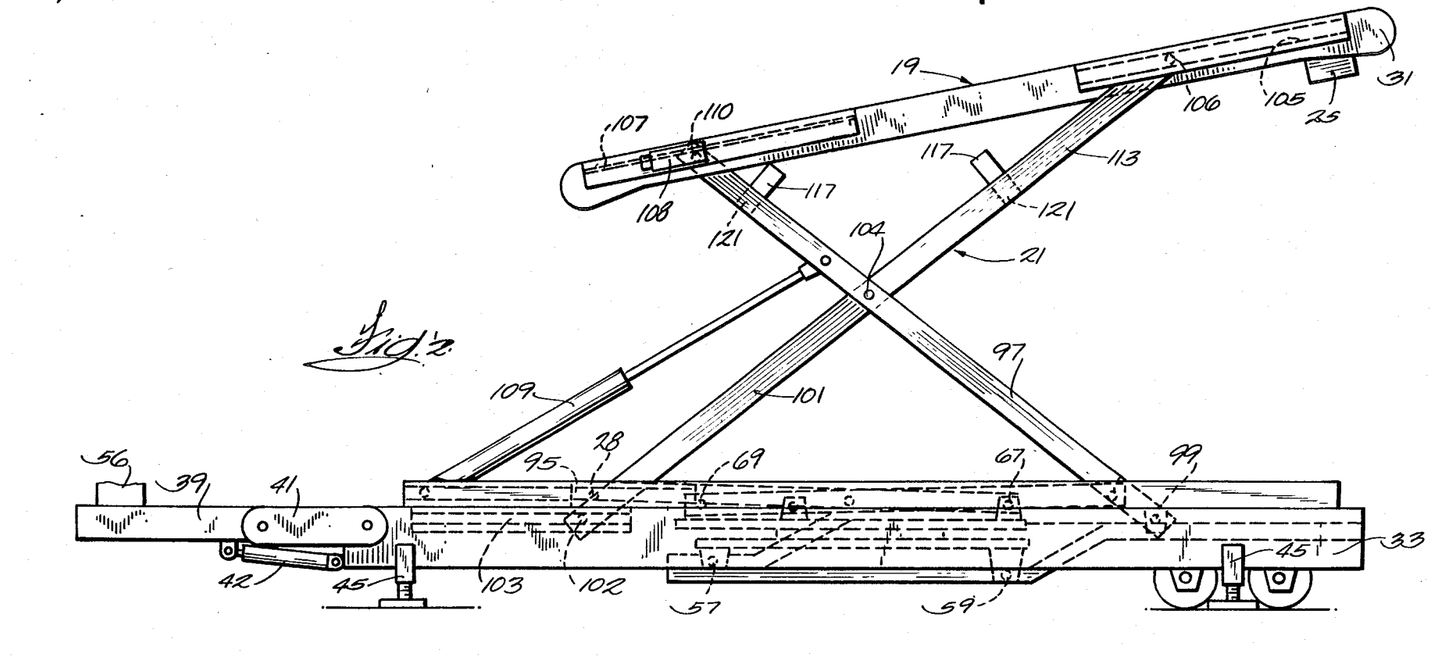
FIG. 2 is a side view of the pipe handling apparatus of the present invention shown in a partially collapsed condition.

To enable the chassis to accommodate exceptionally long pipes, the members 39 and 41 are lowerable into the same general plane as the beams 32, FIG. 2. Conventional outriggers 45 are mounted to each side of the chassis. When it is necessary to handle exceptionally long pipes, the outriggers 45 are lowered to support the front end 35, and the tractor 7 is driven away. The cylinders 42 are operated to lower the members 39 and 41 into the same general plane as the main chassis beams 32. It will be understood that the outriggers 45 may be used at any time to stabilize the present invention when transferring pipe.

To raise a pipe from the ground onto the apparatus of the present invention, a pair of pipe lifting arms 8 are rotatably mounted to the outside of each chassis beam 32. In the construction illustrated in FIGS. 1 and 4, each arm contains a slot 47 adapted to fit over a square shaft 49 which extends longitudinally along the chassis and is supported for rotation within bearing housings 51 mounted at intervals to the beam. Screws and nuts 53 prevent the arms from falling off the shaft 49 during rotation. The shaft may be rotated by a hydraulic motor 55 mounted to a housing 51. Having the arms connected to a common shaft facilitates raising and lowering a pipe which is not symmetrically loaded on the arms and hence which would produce unequal resistance to individual arm hydraulic circuits. The hydraulic controls for operating the motor 55, as well as all other power mechanisms, as will be hereinafter described, are preferably located within a common control station 56 mounted to the top of member 39. In addition, certain functions may be controlled from a handheld portable control box (not shown).

The inside face of each chassis beam 32 supports a pair of tracks 10 and 12. Each track includes a pair of lower horizontal sections 10a and 12a joined by respective ramp sections 10b and 12b to respective upper horizontal sections 10c and 12c. See FIG. 5.

Carriage

In accordance with the present invention, a carriage 9 for reciprocable and swiveling motion with respect to the chassis is mounted within the tracks 10 and 12. For that purpose, the carriage includes a base 11 having a pair of front rollers 57 which ride in track 12 and a pair of back rollers 59 which ride in track 10. The longitudinal spread between the rollers 57 and 59 is equal to the longitudinal distance between the ramp sections 10b and 12b. Thus, the base is reciprocable along the tracks 10 and 12, and the base remains level as it ascends and descends the ramps 10b and 12b. The carriage is preferably reciprocated under power, as for example by a hydraulic motor acting through a speed reducing unit and endless chain or cable, not illustrated.

Figure 6:
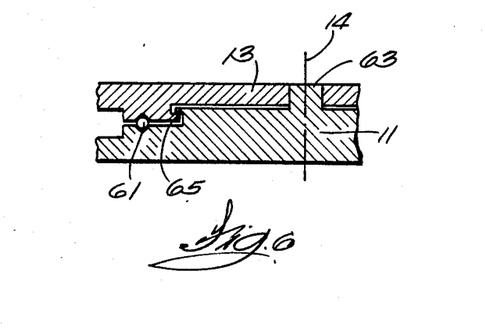
FIG. 6 is a partial sectional view taken along lines 6—6 of FIG. 4.

Mounted on the base 11 for swiveling about a vertical axis 14 is a table 13. In the preferred embodiment, the table 13 is supported on the base by a circle of steel balls 61 which ride within suitable opposed grooves in the base and table, FIG. 6. A center post 63 connected to the base and extending vertically through the table serves as a radial bearing and thereby prevents lateral movement of the table relative to the base. To prevent the possibility of the table overturning under extreme overhang conditions, the table may include an annular flange 65 which slidably bears against a corresponding undersurface of the base.

Platform

The platform 15 is supported on the carriage table 13 for vertical movement relative thereto by a scissors lift 17, FIG. 1. In the construction illustrated in FIG. 4, the platform 15 is fabricated with two outer longitudinal tubular beams 75 and two inner channel beams 77. For clarity, the platform is not shown in the fully collapsed position, but rather the platform is shown in a slightly elevated condition relative to the chassis 3. For additional clarity, the clearances between some of the platform and conveyor structural members are exaggerated.

The four beams 75 and 77 are joined to each other on the ends of the platform 15 by transverse braces, not shown. Each outer beam 75 is rigidly joined to the adjacent inner beam 77 by cross members 79 at regular intervals along the beams. To enable a worker to walk on the platform, the cross pieces 79 are covered with hardwood deckings 81.

The scissors lift 17 is preferably of conventional construction, having fixed and rolling pivot points 67 and 69, respectively, on the table, FIG. 5, and fixed and rolling pivots on the platform as will be described presently. The scissors lift 17 may be raised and lowered under the control of a pair of hydraulic cylinders 82.

Further in accordance with the present invention, the platform 15 is capable of horizontal motion relative to the scissors lift 17. For that purpose, at least one and preferably both inner beams 77 are provided with a rack 83 running longitudinally therealong, FIG. 4. Mounted for rotation in the upper end of scissors lift arm 84 and meshing with the rack 83 is a pinion 85. See FIGS. 1 and 5. Thus, the pinion serves to support the platform on the scissors lift 17. The pinion may be driven by a hydraulic motor 87 and gear box 89. The motor is not actuated when the scissors lift 17 is being expanded or collapsed, so that the pinion serves as a fixed pivot similar to the pivot point 67. The upper end of scissors lift arm 91 supports the rollers 28 which engage tracks 95 joined to the beams 77. Thus, after the platform has been raised to the desired height, operation of hydraulic motor 87 rotates pinion 85 and drives the platform outward toward the drill rig, which is not illustrated. It will be understood that the means for reciprocating the platform relative to the scissors lift 17 is not limited to a rack and pinion drive. For example, reciprocating motion may be accomplished through a hydraulic cylinder. In that case, the pinion 85 and rack 83 would be replaced by a roller and track assembly similar to rollers 28 and tracks 95.

The platform 15 may be driven completely off the rollers 28, so that only the pinions 85 support the platform on the scissors lift 17. To hold the platform in such a situation, the platform includes a brace 27 which is extendible out of the platform. The outer end of the brace 27 is provide with pivotable ground contacting legs 29 which fold up so as to be in the same plane as the brace for retraction with the brace into the platform. See FIGS. 4 and 5. The legs are vertically adjustable by any suitable means so that they support the brace regardless of platform height above the ground.

Conveyor

The conveyor 19 is supported on the platform 15 by a modified scissors lift 21. As illustrated in FIG. 4, the conveyor includes a generally U-shaped channel member 96. The lower end of each pair of legs 97 of the scissors lift 21 is fixedly pivoted at 99 to the platform, FIG. 5. The lower end of each leg 101 includes a roller 102 which slidably engages a track 103 in the platform. Legs 97 and 101 are pivotally joined by a common pin 104. The upper end 113 of each leg 101 slidably engages a track 105 in the channel 96 by means of a roller 106. See FIGS. 2 and 4. The upper end 111 of each leg 97 mounts a pinion 110 which meshes with a rack 107 in a similar manner to that described previously in conjunction with platform rack 83 and pinion 85. Pinions 110 are driven by suitable motors and gear boxes 108.

As the scissors lift 21 is expanded under the action of cylinders 109, the pinions 110, which are held against rotation by the gear boxes 108, sweep along arcs having their centers at the pivots 99. Consequently, the legs 97 impart a horizontal component of motion to the conveyor 19.

In the preferred embodiment, upper end 111 of each leg 97 is substantially shorter than the upper ends 113 of legs 101. Consequently, as the scissors lift 21 expands, the conveyor acquires a tilt upwardly toward the back 33 of the chassis. The preferred angle of inclination of the conveyor with the horizontal when the scissors lift is completely expanded is about 25 degrees. To provide additional horizontal and vertical movement to the conveyor with respect to the scissors lift 21, the motor and gear boxes 108 are actuated to rotate pinions 110. Thus, the conveyor takeoff point 31 may be extended upwardly and to the right as viewed in FIGS. 1, 2 and 5. As with the platform, the conveyor may be reciprocated by means other than the rack and pinion, as, for example, by a hydraulic cylinder.

The conveyor 19 of the present invention includes at least two and preferably three sections of endless belts or chains 23. Referring to FIGS. 1 and 4, the upper surfaces of the belts are coplanar within the channel 96, thereby creating a trough 24 for receiving a pipe P. The belts are connected by conventional chains and sprockets 115 for being driven in unison by hydraulic power source 25 to convey the pipe to the derrick platform.

The purpose of the three belt conveyor is to facilitate removing the pipe from the trough 24 during the pipe unloading operation. Referring to FIGS. 2, 3, and 4, a pair of spades 117 having tapered surfaces 119 are removably attached to cross pieces 121 between the corresponding upper legs 111 and 113 of scissors lift 21. The spades are removed during the pipe loading process, but they are inserted in place during the pipe unloading process. As the scissors lift 21 collapses, the spades protrude into the gaps between the belts 23. The pipe lying on the belts is thus raised off the belts and ejected out of the trough. The tapered surfaces 119 deflect the pipe to one side of the platform. The spades are reversible, so that the pipe being unloaded may be deflected to either side of the platform.

Operation

To operate the pipe handling apparatus of the present invention, the chassis 3 is driven by the tractor 7 so that the chassis is adjacent and parallel to a supply of pipes stacked on the ground near a drilling rig. If the pipe length requires, the outriggers 45 are lowered to support the chassis front end 35, the tractor is driven away, and the cylinders 42 are actuated to lower members 39 and 41. The outriggers may be set up to stabilize the chassis regardless of whether the tractor is driven away.

The proper controls at control station 56 are actuated to rotate hydraulic motor 55 and thereby rotate shaft 49 to lower the arms 8 on the selected side of the chassis, FIG. 4. A pipe P is rolled onto the arms, and the arms are raised so that the pipe rolls off the arms onto the decking 81 of the collapsed platform 15. The pipe then rolls or is pushed across the deck into the trough 24 of collapsed conveyor 19.

The platform 15 and conveyor 19 are manipulated through any of several of combinations of motion to position the conveyor takeoff point 31 accurately under the pipe elevator at the derrick platform. Scissors lift 17 may be operated to vertically raise the platform. The brace 27 with support legs 29 may be pulled out of the platform, the legs adjusted to contact the ground, and the hydraulic motor 87 actuated to move the platform horizontally off the rollers 28 so that the platform is supported by legs 29 and pinions 85. The carriage 9 may be moved along and up the tracks 10 and 12 to the back end 33 of the chassis 3, and the table 13 may be swiveled through the desired angle. Carriage translation and swiveling would occur prior to moving the platform off the rollers 28. It is anticipated that the scissors lift 21 will always be operated to impart horizontal and vertical motions to the conveyor. The conveyor may be translated by means of pinions 110. When the takeoff point is as close to the required location as possible, the power source 25 is actuated to cause the belts 23 to convey the pipe lengthwise to the derrick elevator.

To return a pipe from the derrick to the supply stack, the opposite sequence of operations is performed. However, the scissors lift 21 is always the last member to be collapsed. Prior to collapsing the scissors lift 21, the spades 117 are attached to the cross braces 121. As the scissors lift 21 approaches the fully collapsed configuration, the spades enter the gaps between the belt sections 23 to eject the pipe from the conveyor trough 24 and deflect the pipe to the desired side of the platform. The pipe rolls across the decking 81 to the upraised arms 8, which are then operated to lower the pipe to the ground. Several pipes can be stored on the decking 81 when loading and unloading pipe, hence, the equipment does not have to be fully collapsed for each pipe being transferred. Railings (not shown) can be employed to manage the pipes on the decking 81.

Thus, it is apparent that there has been provided, in accordance with the invention, pipe handling apparatus which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Apparatus for transferring pipe between a supply thereof and a location vertically and horizontally distant from the supply comprising:
   carriage means,
   conveyor means movably mounted on the carriage means for transporting a pipe lengthwise to a conveyor takeoff point, the conveyor means having body member means and endless belt means movably entrained around the body member means, the pipe to be transported receivably on the endless belt means and movable therewith, the conveyor means also having power means for moving the endless belt means, lift means movably mounted on the carriage means for supporting the conveyor means and for expanding from a collapsed position to impart vertical motion to the conveyor means, swivel means mounted on the carriage and to the lift means for swiveling the lift means and conveyor means, transportable chassis means for supporting the carriage means, the lift means, the conveyor means, and the swivel means, and for nestingly receiving the collapsed lift means and conveyor means within the chassis so that the swivel means is held immobile when nested within the chassis, a platform supporting the lift means and adapted to nestingly receive the conveyor means when the lift means is in the collapsed position, and second lift means supported by the chassis for supporting the platform and for expanding from a collapsed position to impart vertical motion to the platform, the second lift means and platform being adapted to nest within the chassis when the second lift means is in the collapsed condition, so that the conveyor means and platform are nested within the chassis when the lift means and second lift means are in the collapsed condition.

2. The apparatus of claim 1 wherein:

the conveyor means includes at least two longitudinally spaced endless belts, the upper surfaces of the belts being substantially co-planar, and the lift means includes spade means for protruding into the longitudinal spaces between the endless belts when the lift means is collapsed, the spade means having tapered surfaces for lifting the pipe from the belts and deflecting the pipe toward a selected side of the chassis when the lift means is collapsed into the chassis.

3. The apparatus of claim 1 wherein the lift means comprises:

a pair of first legs slidably pivoted at one end thereof to a platform and at the second end thereof to the conveyor means, and a pair of second legs fixedly pivoted at a first end thereof to the chassis and at the second end thereof to the conveyor means, the pairs of first and second legs being pivotally pinned together intermediate the ends thereof, the lengths of the sections of the first legs between the slidable pivots at the conveyor means and the pivot pin between the legs being longer than the lengths of the sections of the second legs between the fixed pivots at the conveyor means and the pivot pin between the legs, so that the conveyor means undergoes horizontal motion as the lift means expands and the conveyor means forms an angle with the horizontal when the lift means is expanded.

4. The apparatus of claim 1 further comprising drive means for translating the conveyor means relative to the lift means.

5. The apparatus of claim 4 further comprising:

first means for supporting the platform for reciprocating motion on the second lift means, drive means for supporting the platform on the second lift means and for reciprocating the platform relative to the second lift means, and brace means extendible from one end of the platform for supporting the end of the platform when the platform is reciprocated relative to the second lift means, so that the platform may be reciprocated out of contact with the first support means on the second lift means and the platform is then supported by the drive means and the brace means.

6. The apparatus of claim 4 further comprising carriage means suspended within the chassis for longitudinal movement therealong and for supporting the second lift means.

7. The apparatus of claim 4 further comprising:

associated pairs of tracks mounted within the chassis means, the chassis means having two opposed parallel sides and a pair of tracks on each of the two opposed sides, the tracks having upper and lower horizontal sections joined by corresponding ramped sections, the pair of tracks on one side of the chassis means substantially mirroring the pair of tracks on the other side of the chassis means, the carriage means having rollers movably mounted thereon for moving the carriage, the rollers movable in the tracks' channels and confined therein, the carriage means being levelly movably longitudinally along the horizontal tracks and vertically by movement up the ramped sections to the upper horizontal track section, the swivel means being nonswivelable when the carriage means is on the lower horizontal section of the tracks.

8. Pipe handling apparatus comprising an elongated chassis, platform means having an upper surface and supported by the chassis for vertical movement relative thereto between an elevated position and a lowered position, the platform being adapted to nest within the chassis when in the lowered position, conveyor means mounted to the platform for vertical and horizontal motion relative thereto between an elevated expanded position and a lower collapsed position, the conveyor means being adapted to nest within the chassis when in the collapsed position so that the conveyor means is non-swivelable when nested within the chassis and cannot move in the horizontal plane when nested within the chassis, the conveyor means comprising channel means defining a trough which is at a lower level than the platform means upper surface when the conveyor means is nested wtihin the platform means, and the bottom surface of the trough comprising at least two co-planar longitudinally spaced endless belts rotatably supported by the channel means and driven in unison for longitudinally moving a pipe within the trough, so that when the conveyor means and platform means are nested within the chassis a pipe may be rolled across the platform means upper surface and into the conveyor means trough and onto the endless belts, carriage means for supporting the platform means and for reciprocating along the chassis, the chassis having two opposed sides and a pair of tracks on each of the two opposed sides, the tracks for supporting and guiding the carriage means within the chassis for longitudinal reciprocal motion therealong, each track having a channel along its length open to the interior of the chassis, the tracks on each side of the chassis comprising a pair of substantially horizontal upper and lower sections and a pair of ramped sections connecting the respective upper and lower sections, the tracks on one side of the chassis substantially mirroring the tracks on the other side of the chassis, and the carriage means having rollers movably mounted thereon for moving the carriage, the rollers receivable in and movable in the tracks' channels and confined therein.

9. The apparatus of claim 8 wherein the carriage means comprises base means adapted to roll within the chassis tracks, table means for supporting the platform means and for swiveling about a vertical axis relative to the base means when the carriage means is in the upper sections of the chassis tracks, and the base means being prevented from swiveling when the carriage means is in the lower sections of the tracks.

10. The apparatus of claim 8 further comprising an elongated bar mounted for rotation to at least one side of the chassis, drive means for rotating the bar through a predetermined angle, and arm means having slots for receiving the bar therein and for being rotated by the bar and adapted to hold a pipe thereon when the bar and arm means are rotated to raise the pipe to the level of the platform means upper surface.

11. The apparatus of claim 8 wherein the chassis comprises a pair of longitudinal parallel beams located relatively near the ground, pivotable members connected to an extending to a higher level than the longitudinal beams and adapted to connect a motor vehicle for transporting the chassis, and means for lowering the pivotable members into a plane generally co-planar with the longitudinal beams, so that the pipe handling apparatus can transfer pipes which are longer than the chassis longitudinal beams.

* * * * *